United States Patent Office 3,050,177
Patented Aug. 21, 1962

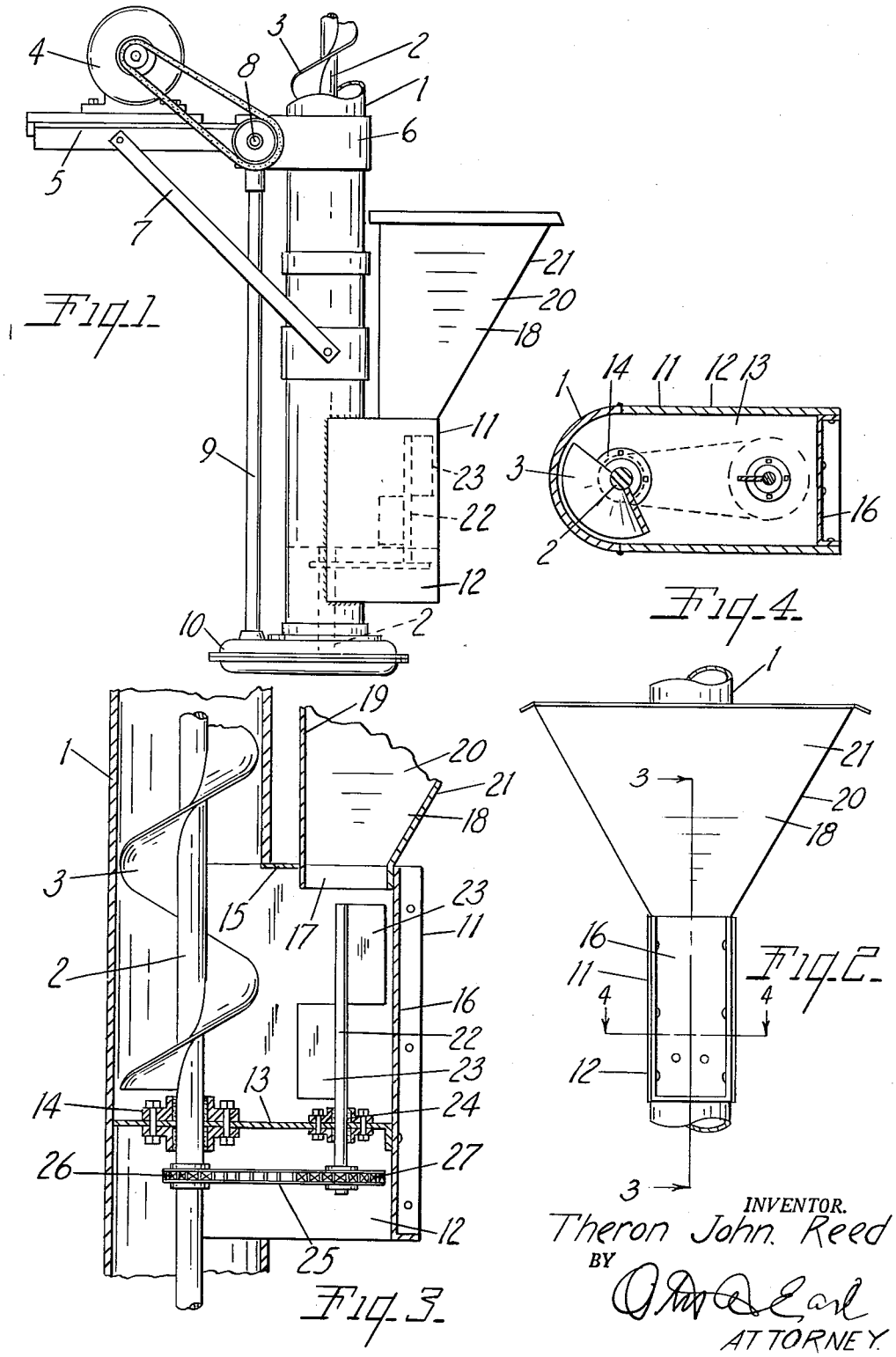

3,050,177
FORCED FEED FOR VERTICAL SCREW CONVEYOR AUGERS
Theron John Reed, Box 57, Burr Oak, Mich.
Filed Dec. 11, 1959, Ser. No. 858,899
6 Claims. (Cl. 198—64)

This invention relates to improvements in forced feed for vertical screw conveyor augers.

The principal objects of this invention are:

First, to provide a receiving hopper and force feed mechanism for effectively delivering loose bulk materials to a vertically disposed elevating screw conveyor or auger.

Second, to provide auger feeding mechanism which will prevent choking and stoppage of the feed of material to a screw auger and will provide continuous delivery to the auger with a minimum of crumbling or grinding effect of the material being handled.

Third, to provide a feed hopper and mechanism for a vertical screw conveyor which is simple and inexpensive and permits the auger to be operated at maximum capacity.

Other objects and advantages of the invention will be apparent from a consideration of the following description and claims. The drawings, of which there is one sheet, illustrate a highly practical form of the auger feeding mechanism.

FIG. 1 is a fragmentary side elevational view of a vertically disposed auger or screw conveyor with the feeding mechanism of the invention mounted thereon.

FIG. 2 is a fragmentary front elevational view of the feed hopper shown in FIG. 1.

FIG. 3 is a fragmentary vertical cross sectional view taken along the plane of the line 3—3 in FIG. 2.

FIG. 4 is a fragmentary horizontal cross sectional view taken along the plane of the line 4—4 in FIG. 2.

Vertical screw conveyors or augers for loose materials such as grain and pelletized materials are old and FIG. 1 discloses such a conveyor consisting of a vertically disposed tube 1 with an auger shaft 2 and spiral auger or screw 3 rotatably mounted therein. A driving motor 4 is mounted on a platform 5 secured to the side of the tube by a supporting collar 6 and brace bar 7. The motor drives a cross shaft 8 connected by suitable bevel gears not shown to a vertical shaft 9 extending downwardly into a gear box 10 and the lower end of the auger shaft 2 is driven from the gear box as will be understood. The gear box 10 may constitute the base or support for the entire conveyor assembly and other drive connections for the auger shaft 2 such as driving connections to the top of the shaft may be provided if desired.

The material feeding structure for delivering loose bulk material to the auger 3 consists of a delivery box 11 having side plates 12 connected to the sides of the tube 1 and opening to a hole in the side of the tube coextensive with the said end of the box 11. A bottom plate 13 is secured between the side plates 12 and projects into the tube 1 to form a partition below the lower end of the auger shaft 2 and above the lower edges of the side plates 12. Bearings 14 secured to the bottom plate locate and guide the auger shaft 2.

A short top plate or cap 15 is secured between the side plates 12 and the upper edge of the hole in the tube to define one side of a generally rectangular feed opening at the top of the box 11. A removable front clean-out plate 16 provides access to the interior of the box. The feed opening at the top of the box receives the delivery neck 17 at the lower end of a feed hopper 18. The hopper 18 is open at the top and has a vertical back wall 19 and outwardly and upwardly inclined side walls 20 and upwardly and outwardly inclined front wall 21.

Positioned underneath the delivery neck 17 is a vertical impeller shaft 22 having diametrically oppositely extending paddles or impeller plates 23 connected thereto one above the other. The impeller shaft 22 is rotatably supported by bearings 24 secured to the bottom plate 13 and is driven by a chain 25 positioned below the bottom plate. The chain 25 drivingly connects a small sprocket 26 on the auger shaft to a relatively larger sprocket 27 on the impeller shaft.

Desirably the impeller shaft operates at about half the rotational speed of the auger shaft. In an auger assembly utilizing a 6 inch tube 1, a practical auger speed is between 500 and 700 r.p.m. and a structure of this type has the capacity of receiving and elevating 725 bushels of ground feed per hour.

The structure described delivers the material from the hopper 18 to the screw or auger 3 which carries away the material before the box 11 can become filled and packed with the material. As a result there is very little grinding and squeezing action on the material being handled and it has been found that the delivery mechanism described has less than 2% grinding action on relatively loose and fragile pelletized agricultural feed materials. While the relatively high rotation speed of the auger 3 creates a centrifugal force tending to throw material outwardly away from the lower end of the auger, the impeller plates 23 deliver the material inwardly to the auger with sufficient force to overcome this centrifugal force so that the lower end of the auger is kept full to provide a continuous upward feed of the material without compacting the material in the box 11 to the point where the auger 3 and the impeller plates 23 operate with a grinding action on the compacted material.

What is claimed as new is:

1. Material feeding structure for a vertically disposed screw conveyor having a tube with an auger rotatably mounted therein comprising a feed box secured to one side of said tube and projecting therefrom, said box having an open side registering with a hole formed in the side of said tube opposite the lower end of said auger, a bottom plate in said box positioned below the lower end of said auger and above the bottoms of the sides of the box, the shaft of said auger extending through said bottom plate and being provided with a bearing secured to said bottom plate, a removable front wall on said feed box defining one side of a rectangular feed opening in the top of said box alongside of said tube, a feed hopper with downwardly converging walls and a delivery neck positioned in the opening at the top of said box, an upright impeller shaft rotatably mounted on said bottom plate below said neck and opposite the lower end of said auger, vertically disposed rectangular impeller plates extending radially from said impeller shaft in opposite directions and one above the other, said impeller plates having their peripheries spaced substantially from the walls of said feed box and from said auger, and chain and sprocket means positioned below said bottom plate and drivingly connected between said auger shaft and said impeller shaft to drive the impeller shaft at about half the speed of the auger shaft.

2. Material feeding structure for a vertically disposed screw conveyor having a tube with an auger rotatably mounted therein comprising a feed box secured to one side of said tube and projecting therefrom, said box having an open side registering with a hole formed in the side of said tube opposite the lower end of said auger, a bottom plate in said box positioned below the lower end of said auger, the shaft of said auger extending through said bottom plate and being provided with a bearing secured to said bottom plate, a removable front wall on said feed box defining one side of a rectangular feed opening in the top of said box alongside of said tube, a feed hopper with downwardly converging walls and a delivery neck positioned in the opening at the top of said box, an upright impeller shaft rotatably mounted on said bottom plate below said neck and opposite the lower end of said auger, vertically disposed impeller plates extending radially from said impeller shaft in opposite directions and one above the other, said impeller plates having their peripheries spaced substantially from the walls of said feed box and from said auger, and chain and sprocket means positioned below said bottom plate and drivingly connected between said auger shaft and said impeller shaft to drive the impeller shaft at about half the speed of the auger shaft.

3. Material feeding structure for a vertically disposed screw conveyor having a tube with an auger rotatably mounted therein comprising a feed box secured to one side of said tube and projecting therefrom, said box having an open side registering with a hole formed in the side of said tube opposite the lower end of said auger, a bottom plate in said box positioned below the lower end of said auger, the shaft of said auger extending through said bottom plate, a removable front wall on said feed box defining one side of a rectangular feed opening in the top of said box alongside of said tube, a feed hopper with downwardly converging walls and a delivery neck opening to the opening at the top of said box, an upright impeller shaft rotatably mounted below said neck and opposite the lower end of said auger, vertically disposed impeller plates extending radially from said impeller shaft in opposite directions, said impeller plates having their peripheries spaced substantially from the walls of said feed box and from said auger, and means positioned below said bottom plate and drivingly connected between said auger shaft and said impeller shaft to drive the impeller shaft at about half the speed of the auger shaft.

4. Material feeding structure for a vertically disposed screw conveyor having a tube with an auger rotatably mounted therein comprising a feed box secured to one side of said tube and projecting therefrom, said box having an open side registering with a hole formed in the side of said tube opposite the lower end of said auger, a bottom plate in said box positioned below the lower end of said auger, a front wall on said feed box defining one side of a rectangular feed opening in the top of said box alongside of said tube, a feed hopper with downwardly converging walls opening to the top of said box, an upright impeller shaft rotatably mounted in said box below said hopper and opposite the lower end of said auger, impeller plates extending radially from said impeller shaft in opposite directions and one above the other, said impeller plates having their peripheries spaced substantially from the walls of said feed box and from said auger, and means positioned below said bottom plate and drivingly connected between said auger shaft and said impeller shaft to drive the impeller shaft at about half the speed of the auger shaft.

5. Material feeding structure for a vertically disposed screw conveyor having a tube with an auger rotatably mounted therein comprising a feed box secured to one side of said tube and projecting therefrom, said box having an open side registering with a hole formed in the side of said tube opposite the lower end of said auger, a bottom plate in said box positioned below the lower end of said auger, said feed box defining a rectangular feed opening in the top of said box alongside of said tube, a feed hopper with downwardly converging walls opening to the top of said box, an upright impeller shaft rotatably mounted in said box below said hopper and opposite the lower end of said auger, impeller plates extending radially from said impeller shaft, said impeller plates having their peripheries spaced substantially from the walls of said feed box and from said auger, and means drivingly connected between said auger shaft and said impeller shaft to drive the impeller shaft.

6. Material feeding structure for a vertically disposed screw conveyor having a tube with an auger rotatably mounted therein comprising a feed box secured to one side of said tube and projecting therefrom, said box having an open side registering with a hole formed in the side of said tube opposite the lower end of said auger, a bottom plate in said box positioned below the lower end of said auger, said feed box defining a feed opening in the top of said box alongside of said tube, a feed hopper with downwardly converging walls opening to the top of said box, an upright impeller shaft rotatably mounted in said box below said hopper and opposite the lower end of said auger, impeller plates extending radially from said impeller shaft, said impeller plates having their peripheries spaced substantially from the walls of said feed box and from said auger, and means drivingly connected between said auger shaft and said impeller shaft to drive the impeller shaft.

References Cited in the file of this patent
UNITED STATES PATENTS

| | | |
|---|---|---|
| 972,761 | Gauntt | Oct. 11, 1910 |
| 1,295,959 | Bowman | Mar. 4, 1919 |
| 2,504,289 | Waterman | Apr. 18, 1950 |
| 2,934,201 | O'Brien | Apr. 26, 1960 |